H. WOODLEY.
CURTAIN AND FABRIC STRETCHER.
APPLICATION FILED APR. 26, 1916.

1,223,015. Patented Apr. 17, 1917.

WITNESSES:
Boyd R. Abbott.
L. J. Forde.

INVENTOR
Henry Woodley
BY Strong & Townsend.
ATTORNEYS

UNITED STATES PATENT OFFICE.

HENRY WOODLEY, OF WEST BERKELEY, CALIFORNIA.

CURTAIN AND FABRIC STRETCHER.

1,223,015.    Specification of Letters Patent.    Patented Apr. 17, 1917.

Application filed April 26, 1916. Serial No. 93,705.

*To all whom it may concern:*

Be it known that I, HENRY WOODLEY, a citizen of the United States, residing at West Berkeley, in the county of Alameda and State of California, have invented new and useful Improvements in Curtain and Fabric Stretchers, of which the following is a specification.

My invention relates to a device which is especially designed for stretching curtains or like fabrics in a desired shape, while being dried after washing, and generally maintaining such fabrics in a desired condition of tension.

It consists of a frame comprising hollow guiding corners, with travelers movable within said guides, and screws passing through said guides and travelers and turnable so as to advance the travelers, said corners being connected with each other in such a manner that an even and regular tension may be applied to stretch the fabric which is secured to these corners.

It also comprises details of construction which will be more fully explained by reference to the accompanying drawings, in which—

Figure 1:
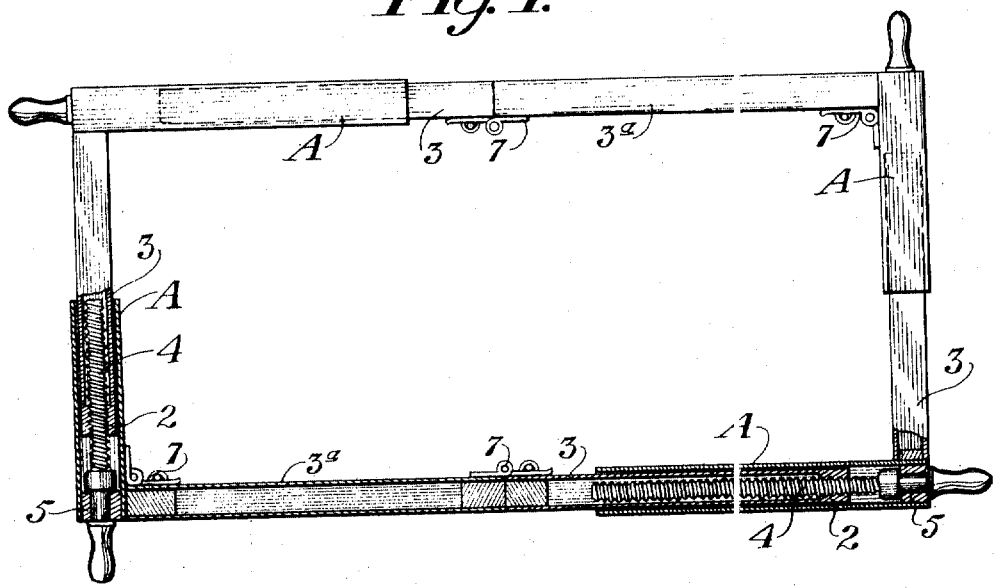
Figure 1 is a plan view and partial section of my device.
Figure 2:
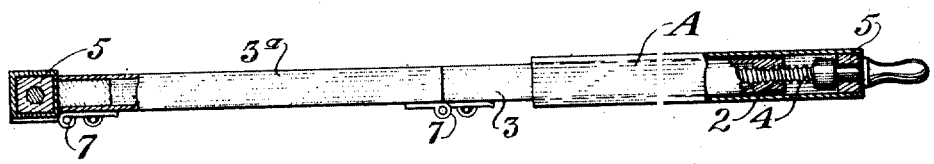
Fig. 2 is a side elevation, showing a section of the guide and traveler.
Figure 3:
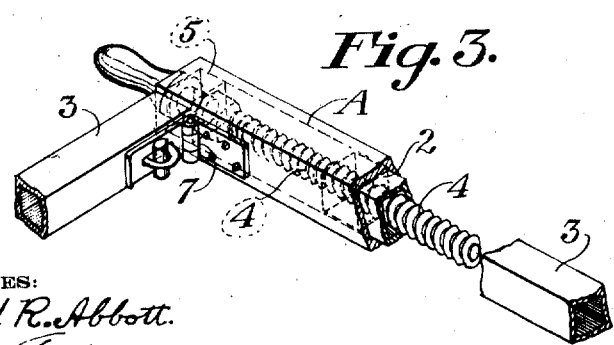
Fig. 3 is a perspective view of one corner.

For the purpose of stretching curtains or any fabric which is required to be stretched, I have shown supports A, to which the corners of the fabric may be attached. These supports are rectangularly arranged and separated sufficiently to receive any size of material which is to be stretched, and the portions intermediate the supports A are left free. These supports A may be of any suitable shape and with the tubular bars 3 serve as guides within which screw-threaded nuts or travelers 2 are designed to move.

The traveling nuts 2 are threaded and adapted to receive screw shanks 4 which are turnable in the nuts. These screw shanks are turnable, without advancing, through collars 5 which are fixed in the ends of the members A, so that the screws may be turned around in these collars, and the threads of the screws will cause the traveling nuts 2 to advance in one direction or the other, carrying with them the members A. Each traveler 2 is connected by a tubular bar 3 with the side of the member A which forms the adjacent corner.

The bars 3 have their ends attached to the movable nuts and the opposite ends are attached to the sides of the member A which is in line therewith. When the screws are turned they will advance through the nuts and will thus carry the outer members or guides A toward or away from each other, and any article which has been fastened to these outer members will have a simultaneous movement of its angles. Thus when the transversely disposed screws are turned, the members A, which constitute one side of the device, will be moved away from each other; one screw acting to move one of said members and the other acting to move the one which is diagonally opposite. The longitudinal movements are effected in the same manner by turning the screws of the diagonally disposed members A, and the curtain or other fabric will thus be stretched as evenly and with as much tension as may be desired.

3—3 represent bars from the sides of the guides A in line with the screw shanks. These bars are tubular so that the ends of the screw shanks may move within the tubes as they are advanced or retracted, and the bars thus serve as guides to steady the movement of the screws.

If desired, devices of this character may be fitted to stretch window screens, in which case the device might be more or less square, and the edges of the screen material are attached so that it could be properly stretched before being secured to its permanent frame.

It will be manifest that smaller sizes and modifications of the mechanism will make it applicable to make ties, scarfs, ribbons and other articles which it is desired to stretch and maintain in a smooth condition.

The bars 3 may be made in sections and these sections may be united by means of hinges 7. If it is desired to reduce the size of the device, the hinges allow a diagonally opposed section 3ª to be taken out, and the remaining portions may be brought together and united to complete a frame of smaller size.

Having thus described my invention, what I claim and desire to secure by Letters Patent is—

1. A device for stretching fabrics, consisting of four tubular supports having fixed collars, one diagonally located pair being longitudinally disposed, and the intermediate pairs at right angles thereto, threaded travelers slidable in said supports, connections having one end fixed to a traveler and the opposite end to the side of the opposed transverse support, and screws turnable in threads in the travelers and in the fixed collars in the supports.

2. In a device for stretching fabrics, internally threaded blocks, fabric supports slidable upon the blocks, screws, the threads of which fit the blocks, collars fixed in the supports in which the screw shanks are turnable to advance the supports longitudinally and transversely, connections between each block and the contiguous fabric support, and tubular extensions from the supports within which the ends of the screws are guided and movable.

3. In a device of the character described, internally threaded blocks, fabric supports slidable upon the blocks, collars fixed in the supports, screws, the shanks of which are turnable in the collars, and the threads turnable in the blocks, bars connecting the blocks with the adjacent supports, said bars being made in sections, and means to disconnect said sections and reduce the size of the frame.

In testimony whereof I have hereunto set my hand in the presence of two subscribing witnesses.

HENRY WOODLEY.

Witnesses:
LOUIS S. HARRIS,
GEORGE SCHMIDT.